Sept. 30, 1924.
R. B. HARDING
AUGER GUIDE
Filed Oct. 17, 1923
1,510,219
2 Sheets-Sheet 1
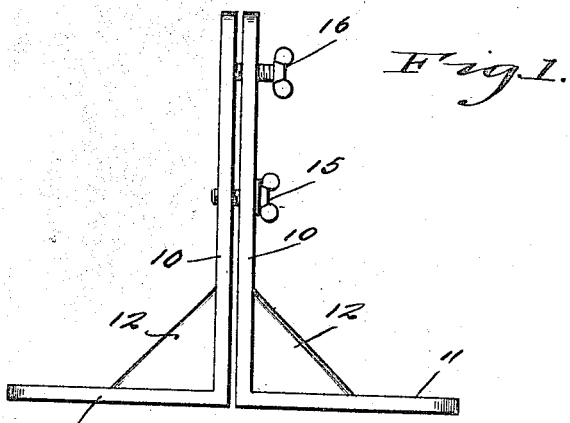
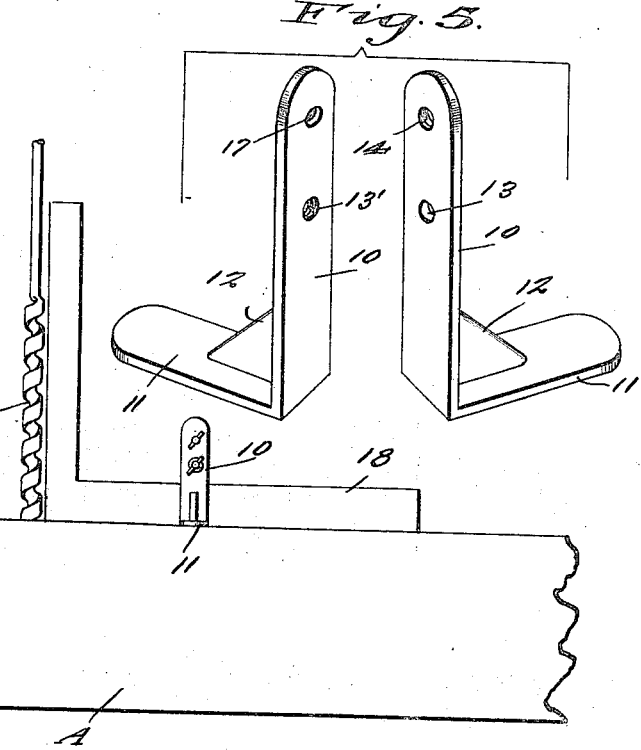
R. B. Harding INVENTOR
BY
ATTORNEY
WITNESSES

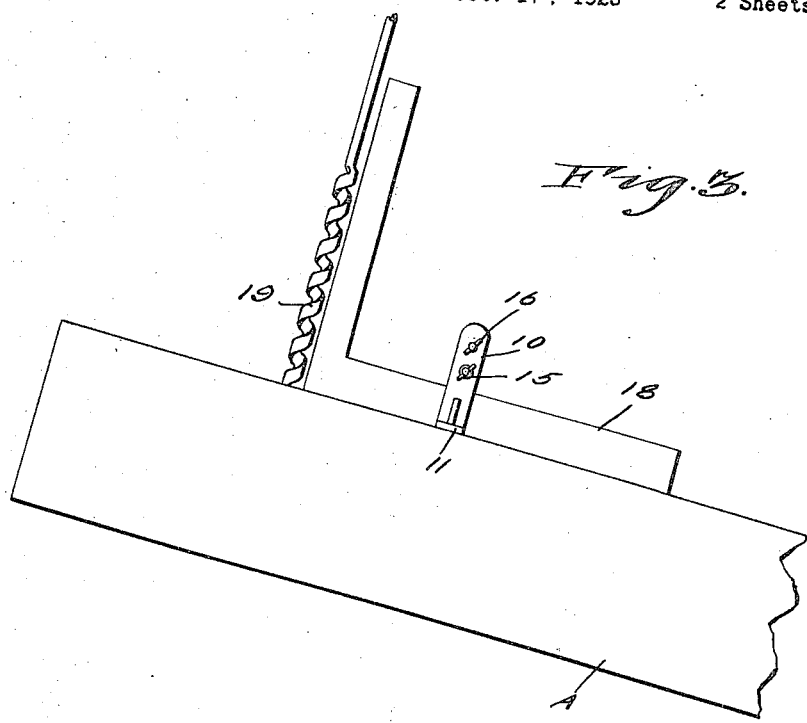
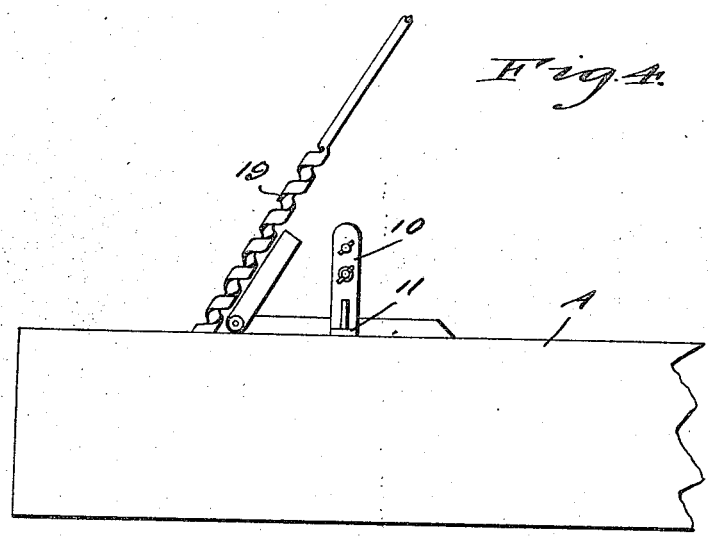

Patented Sept. 30, 1924.

1,510,219

UNITED STATES PATENT OFFICE.

ROSWELL B. HARDING, OF BUCKLEY, WASHINGTON.

AUGER GUIDE.

Application filed October 17, 1923. Serial No. 669,176.

*To all whom it may concern:*

Be it known that I, ROSWELL B. HARDING, a citizen of the United States, residing at Buckley, in the county of Pierce and State of Washington, have invented new and useful Improvements in Auger Guides, of which the following is a specification.

This invention contemplates the provision of an auger guide, so that the hole to be made, whether it is to be vertically arranged or at an angle through the work can be accurately bored.

More specifically stated, the invention contemplates the provision of a two part clamp adapted to be used with a square, the latter being arranged between the respective parts of the clamp and supported upon the work and utilized as a gauge or guide to make it possible to accurately bore the hole at any desired angle.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view in elevation of the clamp showing the parts associated for use.

Figure 2 is a view showing the manner of using the clamp in connection with a square with the work supported in a true horizontal position.

Figure 3 is a similar view showing the manner of using the guide with the work in a tilted position.

Figure 4 is a view showing the manner of using the clamp in conjunction with a bevelled square when it is desired to bore a hole at an angle through the work.

Figure 5 is a perspective view of one member of the clamp.

The device forming the subject matter of the present invention is in the nature of a two part clamp, the respective parts being identical in construction, and each including an upright 10 and a base member 11. These parts are suitably braced by a web 12. One of the clamping members is provided with spaced superimposed threaded openings 13 and 14 respectively, while the other clamping member is provided with a threaded opening 13' adapted to be arranged in alignment with the opening 13 of the first mentioned member when the clamp is in use. These openings 13 and 13' accommodate a thumb screw 15 utilized to hold the clamping members operatively associated. A thumb screw 16 is received by the other opening 14 of one of the clamping members and is adapted to be received by a recess or depression 17 formed in the confronting face of the other clamping member, the said screw 16 being utilized to effect an adjustment of the clamping members when such adjustment is necessary. In other words, the said screw 16 is utilized to space the base members 11 the requisite distance so that the clamp will set level upon the work indicated at A. The clamp is adapted to be used in conjunction with a square to serve as a guide for the workman and to enable him to accurately bore the hole to be made through the work A, whether the hole is to be bored vertically through the work or obliquely therethrough. In Figure 2, I have shown the clamp associated with a square 18, one limb of the square being held between the respective parts of the clamp, with the other limb of the square projecting upwardly. The auger 19 is adapted to be arranged in juxta-position to the vertically disposed branch of the square, so that a workman can be readily guided in the work to be accomplished and accurately bore the hole to be made. In Figure 3, I have shown the work A tilted, but by the use of the guide hereinabove described and also shown in Figure 3, the work can also be accurately bored. In Figure 4, I have shown the clamp used in conjunction with a bevel square, the latter being arranged between the respective parts of the clamp, but with the movable limb of the square arranged at the proper degree of inclination with respect to the work to serve as a guide, and thus enable the workman to accurately bore the work at any angle.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In an auger guide, a clamp comprising spaced uprights, a base member projecting at a right angle from the lower end of each upright, whereby said clamp can be supported upon the work to be bored, a set screw connected with the respective parts of the clamp for holding them operatively related, an additional set screw carried by one part of the clamp and cooperating with the other part to effect an adjustment between said parts, and a square adapted to be arranged between the parts of the clamp for the purpose specified.

In testimony whereof I affix my signature.

ROSWELL B. HARDING.